Patented Aug. 16, 1932

1,872,479

UNITED STATES PATENT OFFICE

HOWARD W. MATHESON, OF MONTREAL, QUEBEC, CANADA, ASSIGNOR TO CANADIAN ELECTRO PRODUCTS COMPANY, LIMITED, OF MONTREAL, QUEBEC, CANADA

PROCESS OF PRODUCING ACETIC ANHYDRIDE FROM ETHYLIDENE DIACETATE

No Drawing.      Application filed December 12, 1929. Serial No. 413,684.

This invention relates to a process of producing acetic anhydride from ethylidene diacetate, and the principal objects of the invention are to obtain a high rate of yield, a high percentage conversion, and to avoid side reactions which produce undesirable bodies difficult to separate from the anhydride.

It has been proposed already to produce acetic anhydride by heating ethylidene diacetate at temperatures below its boiling point with a catalyst. The disadvantages of such processes are that side reactions occur in which acetic acid, vinyl acetate and tarry bodies are produced. Under the conditions of the reaction the vinyl acetate is partially polymerized and produces a tarry or gummy mass in the reaction vessel. Furthermore, using a catalyst such as sulphuric acid, the acid is partially reduced to $SO_2$, which causes the acetaldehyde liberated to react spontaneously in the rectifying column forming paraldehyde which is difficult to separate from the anhydride by rectification. It has also been proposed (U. S. Patent 1,152,098) to heat vapors of ethylidene diacetate to a temperature of 250° to 300° C., but it has been found that according to this process the percentage conversion is undesirably low, and that side reactions occur, such as the formation of acetic acid and vinyl acetate.

According to the present invention, ethylidene diacetate is converted, practically theoretically into acetic anhydride and acetaldehyde by a cracking process in which the vapor of ethylidene diacetate is suddenly subjected to a high temperature, namely between 300° and 450° C. without use of catalysts. The duration of heating is the time necessary for the conversion which is usually one to two seconds for a gas stream of small diameter, but which may be extended to over six seconds without disadvantage. At temperatures below 300° C. side reactions occur and the decomposition is incomplete whereas above 450° C. undesirable decomposition products result, such as carbon monoxide and methane, showing that molecules of aldehyde (or possibly acetic acid) are decomposed with consequent loss of overall yield. The optimum temperature is around 400° C. The reaction is most conveniently conducted by passing the vapor through a heated tube connected to a continuous still by means of which the acetaldehyde and preferably both aldehyde and anhydride are removed continuously from unconverted diacetate which may be refluxed to the cracking tube. The aldehyde is also preferably separated from the anhydride.

The following example illustrates the practice of the invention.

Example 1

A coil of 12 feet of Pyrex tubing of 4 mm. diameter is immersed in a lead bath which is maintained at an average temperature of 410° C. 243 gms. of ethylidene diacetate is passed into the top of the coil at such rate that the average time of contact is 1.1 seconds. The issuing vapors are condensed by any suitable means. Starting with a commercial grade of ethylidene diacetate containing 94.4 per cent ethylidene diacetate, 4 per cent acetic acid, and 1.6 acetic anhydride, the condensed vapors from the coil contain, acetic anhydride 63.5 per cent; acetaldehyde 23 per cent; acetic acid 6.7 per cent; vinyl acetate 1.8 per cent, and ethylidene diacetate 5 per cent.

From the foregoing it will be seen that the yield of anhydride on the ethylidene diacetate converted is almost 96 per cent while 95 per cent of the ethylidene diacetate passed through the tube is converted, and only 3.3 per cent of the diacetate is converted to acetic acid.

For commercial operations a coil of steel or steel alloy or copper tube has been found as satisfactory as Pyrex tubing. Contact masses may also be used in the reaction tube, but not catalyst is necessary.

I claim:

1. A process of making acetic anhydride which comprises heating vapor of ethylidene diacetate to a temperature of 300° to 450° C.

2. A process of making acetic anhydride which comprises heating vapor of ethylidene diacetate to a temperature of about 400° C.

3. A process of making acetic anhydride which comprises heating vapor of ethylidene diacetate to a temperature of 300° C. to 450° C. and continuously condensing acetaldehyde out of the produced vapor mixture.

4. A process of making acetic anhydride which comprises heating vapor of ethylidene diacetate to a temperature of about 400° C. and continuously condensing acetaldehyde out of the produced vapor mixture.

5. A process of making acetic anhydride which comprises suddenly heating a stream of vapor of ethylidene diacetate to a temperature of 300° to 450° C. and continuously condensing the produced vapors with separation of formed anhydride and aldehyde from unchanged diacetate.

6. A process of making acetic anhydride which comprises suddenly heating a stream of vapor of ethylidene diacetate to a temperature of about 400° C. and continuously condensing the produced vapors with separation of formed anhydride and aldehyde from unchanged diacetate.

7. A process of making acetic anhydride which comprises heating vapor of ethylidene diacetate to a temperature of 300° to 450° C. by passing the vapor through a suitably heated tube at such rate that the duration of contact is not more than approximately six seconds.

In witness whereof, I have hereunto set my hand.

HOWARD W. MATHESON.